3,014,785
METHOD OF PRODUCING AMMONIUM SULFATE FROM COKE OVEN GAS AND WASTE FERROUS SULFATE PICKLE LIQUOR
George E. Muns, Beaver, Donald C. Berkebile, Industry, and John Dasher, Mount Lebanon, Pa., assignors to Crucible Steel Company of America, Pittsburgh, Pa., a corporation of New Jersey
Filed May 22, 1958, Ser. No. 737,118
11 Claims. (Cl. 23—119)

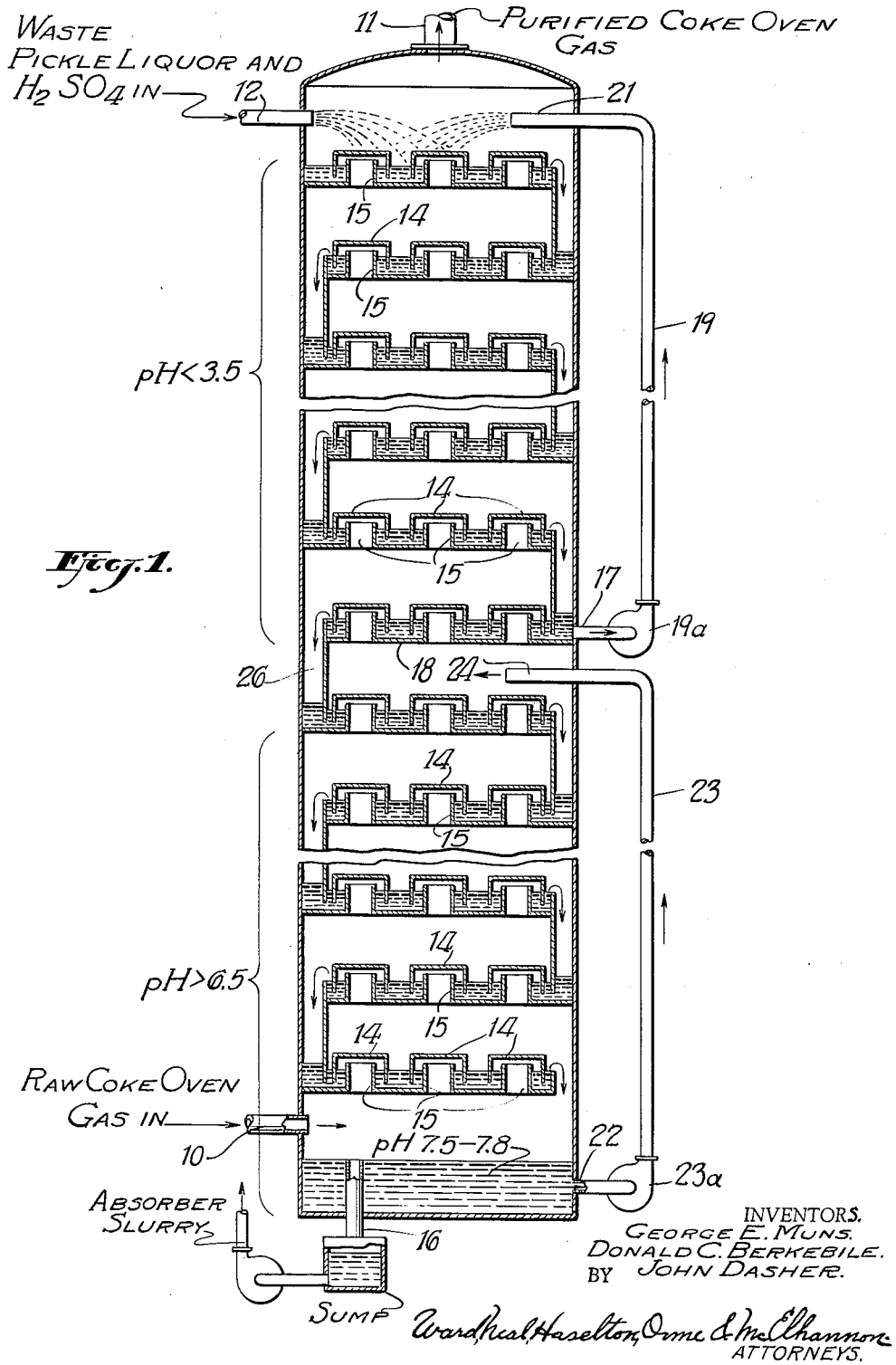

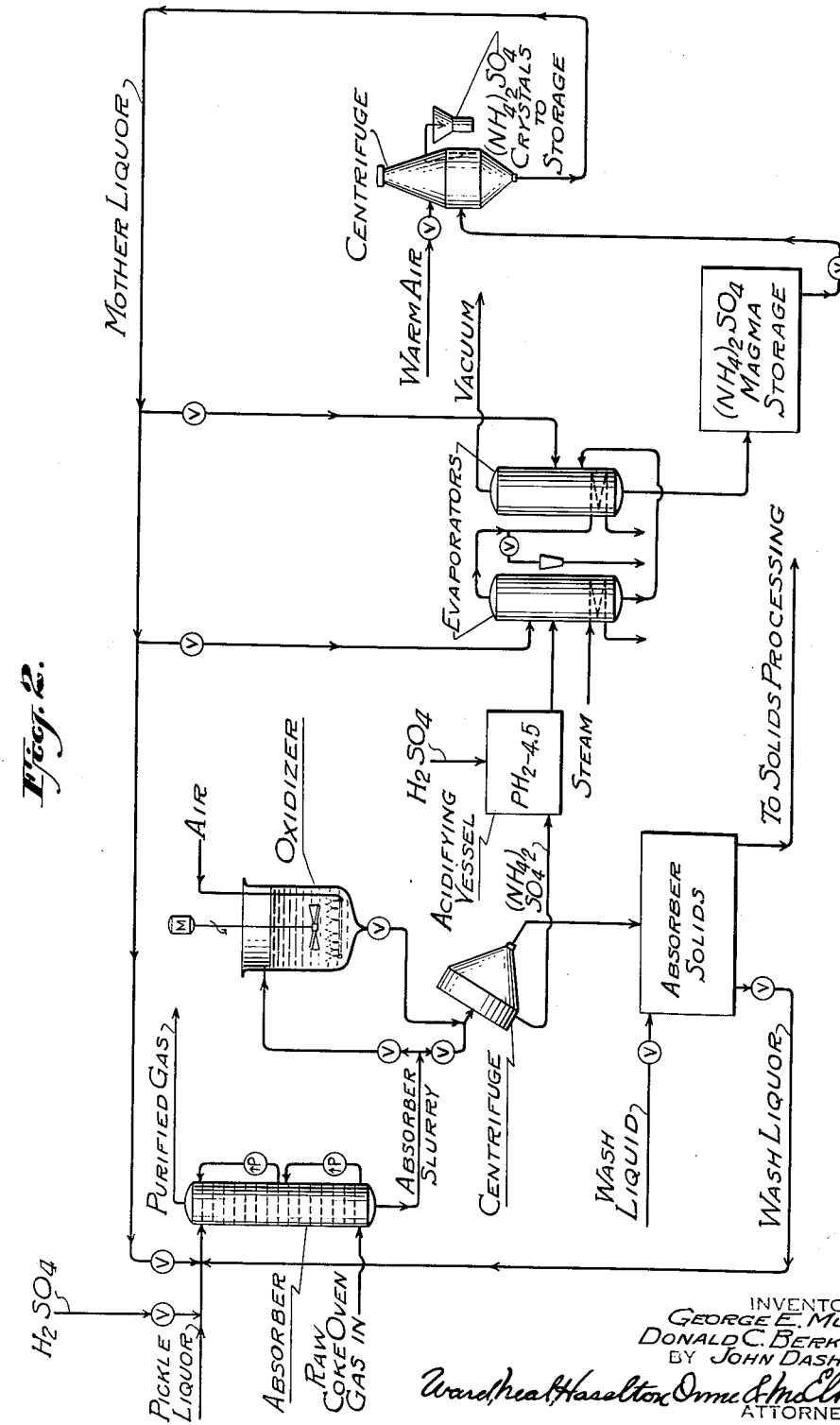

This invention relates to the treatment of raw coke oven gas with waste pickle liquor, and particularly to an improved method for carrying out the reaction between ferrous sulfate-containing pickle liquor and raw coke oven gas. In another aspect, it relates to an improved method for recovering ammonium sulfate substantially free of ferrous iron from the products of said reaction.

Spent pickle liquor resulting rom the cleaning of steel with sulfuric acid is essentially an aqueous solution containing up to about 40% ferrous sulfate and about 5 to 10% free sulfuric acid, and for many years, has posed a disposal problem. For example, in order to prevent stream pollution by discharge of the waste liquor thereto, it is commonly neutralized with lime. However, the resulting sludge consisting of iron oxide and calcium sulfate is of no apparent value.

Raw coke oven gas which contains ammonia, hydrogen sulfide, hydrogen cyanide and pyridine is customarily purified by treatment with sulfuric acid, which enables recovery of the ammonia, and also removes quantities of the pyridine and its homologs, known collectively as the "tar bases," from which these constituents may be recovered.

Utilization of spent pickle liquor instead of fresh sulfuric acid in the treatment of raw coke oven gas is of course obvious and the savings which result are substantial. Many processes employing these starting materials have been proposed and in each of them one of the primary products is ammonium sulfate although in some instances provisions are made for the recovery of iron oxide, elemental sulfur, pyridine and ferrocyanides. Certain of such processes are described in U.S. Patents 2,511,306 and 2,511,307 to W. Tiddy, and U.S. Patent 2,712,980, R. D. Hoak, and also in the copending Muns and Berkebile U.S. application S.N. 516,698, filed June 20, 1955, now United States Patent No. 2,880,061. In each of these processes, the primary product is ammonium sulfate. However, in order to produce crystals of this material substantially free of ferrous iron which will not discolor by reason of oxidation of entrained ferrous ions upon contact with air, in each of the above processes, as well as others heretofore known, whether or not the solids have been oxidized, some of the ferrous sulfate remains in the sulfate solution after the solids have been removed. The dissolved oxygen in the solution reacts with this ferrous iron to form, if present in sufficient amount, a strongly colored, colloidal solution from which colorless ammonium sulfate crystals cannot be produced. This does not occur, however, in the Muns et al. process owing to the low residual ferrous iron content after the separation step.

The Muns et al. application directs oxidation of the absorber slurry for several reasons, among which is the desire to recover iron, pyridine and sulfur values, with subsequent separation of ammonium sulfate solution from the oxidized mixture. Provision is also made to allow the sulfate solution to stand for a considerable period of time which ordinarily permits the small amount of residual iron present, eventually to flocculate and settle out. The clarified ammonium sulfate solution thus rendered of the requisite degree of purity for production of ammonium sulfate crystals which will not turn brown upon exposure to air, is then decanted and evaporated. In one of its aspects, the present invention successfully eliminates the necessity for removing residual iron present in the ammonium sulfate solution following oxidation.

In the process of the aforesaid Tiddy patents, the solids in the absorber slurry are separated and the remaining ammonium sulfate solution is oxidized prior to crystallization. Tiddy also points out that if the presence of iron in the ammonium sulfate crystals is not objectionable, the oxidation step may be omitted. The present invention, on the other hand, provides, in one of its aspects, a process for the production of very low and, in effect, substantially iron-free ammonium sulfate crystals, without first oxidizing the separated aqueous ammonium sulfate.

In the following description reference to made to the accompanying drawings wherein:

FIG. 1 is a schematic axial section of a preferred form of tower for carrying out the coke oven gas-ferrous sulfate containing spent pickle liquor absorption reaction; while FIG. 2 is a schematic flow diagram of our process for recovering ammonium sulfate crystals substantially free from ferrous iron.

In accordance with the present invention, raw coke oven gas which has been detarred, is fed to a contacting or absorber vessel where it is caused to flow countercurrently to a stream of spent pickle liquor. The vessel may be any conventional liquid-gas absorbing device with provision for handling the slurry which results, but is preferably a multiple plate tower provided with bubble caps as illustrated in FIG. 1. The raw coke oven gas is fed to the tower over a supply line 10 just below the bottom plate from whence it flows upwardly through the column and is exhausted through outlet 11. Waste ferrous sulfate-containing pickle liquor, to which free sulfuric acid may be added as discussed below, is fed over line 12 to the uppermost plate of the tower. The liquor flows downwardly through the tower and by reason of bubble caps 14 above gas risers 15 is brought into intimate contact with the rising gas on each plate. As a result, reactions occur between the ammonia, hydrogen sulfide, hydrogen cyanide and pyridine of the gas and the free sulfuric acid and ferrous sulfate of the pickle liquor to form solids and ammonium sulfate.

The countercurrent passage of gas and liquor produces a pH gradient down through the column. The pH of the pickle liquor introduced at the top, which ordinarily is of the order of about 0.5–1.5, is increased as it traverses the tower, removing ammonia and pyridine bases from the ascending gases. Spraying the acid pickle liquor onto the top plate provides intimate contact with the already substantially completely neutralized gas and assures maximum removal of ammonia and other alkaline constituents therefrom.

In accordance with this invention the flow rates of liquor and gas are so adjusted that the slurry which collects at the bottom of the tower adjacent discharge outlet 16 has a pH between about 7.5 and 7.8. That is to say, the reaction is completed in this range. The lower pH assures substantially complete reaction of the ferrous iron to insoluble iron sulfide and complex iron-ammonium ferro-cyanides, the pyridine to complex ferro-cyanides and the sulfate radical to ammonium sulfate. The higher pH value aforesaid approximates the upper limit at which the complex ferrocyanides will remain insoluble and thus not contaminate the ammonium sulfate. In order for the ferrocyanide complexes to be formed as insoluble materials in the tower, it is thus necessary for reaction to take place at a pH of 7.8 or under. The conversion of that portion of the ferrous iron which does not react with the cyanide to ferrous sulfide, takes place best at a pH above 7.5. Thus, when the liquid in the bottom of the absorption tower is maintained at a pH in the range of 7.5 to 7.8, all of the hydrogen cyanide reacts to form the insoluble ferrous ammonium ferrocyanide complex, and all of the remaining iron is converted by the hydrogen sulfide to insoluble ferrous sulfide. Under the aforementioned conditions, the pyridine in the raw coke oven gas reacts with the ferrocyanide formed from the HCN of the gas and the iron of the pickle liquor to form insoluble or sparingly soluble complex metalloorganic compounds, thus effecting complete precipitation of pyridine values, which leave the absorption tower in the slurry produced.

Generally the sulfate and free acid in the pickle liquor are less than required to neutralize ammonia in the coke oven gas, and additional free sulfuric acid must be supplied to make up the difference. The present invention thus contemplates the addition of free sulfuric acid to the waste pickle liquor prior to introduction to the tower or simultaneously introducing the free acid with the pickle liquor, thereby assuring substantially complete absorption of ammonia in the tower, thus obviating the necessity for a second tower for scrubbing ammonia from the off gas.

As above stated, the pH of the entering pickle liquor which is sprayed through the escaping coke oven gas from which most of the reacting basic constituents have already been removed through contact on the lower plates of the absorber, is about 0.5–1.5. As a result of this intimate liquid-gas contact thereabove, the pH of the liquid on the uppermost plate is somewhat higher than at its point of introduction to the tower, and the pH rises until it is between about 7.5 and 7.8 at the bottom. However, between pH 3.5 and 6.5, the reacting slurry is sufficiently sticky to clog up the bubble caps. On the other hand, above or below this range, the slurry is not sticky and does not interfere with proper functioning of the absorber. To avoid the formation of a sticky, viscous slurry, the absorption is therefore carried out in two steps, in upper and lower zones of the absorber, respectively, the first at a pH below 3.5 and the second at a pH above 6.5. This is achieved in the FIG. 1 embodiment by withdrawing a stream of the liquid from a point in the absorber somewhat near the middle and returning it to a higher plate, preferably the top plate, as by means of a conduit 17, 19, 21 containing a pump 19a. The point of withdrawal is so selected and the amount of liquid thus recirculated is such that at no point in this upper zone of the absorber does the pH rise above 3.5. The purpose of this is to prevent substantially precipitation of iron compounds in this upper zone of the absorber, while the ammonia is being removed to the desired extent from the coke oven gas. In similar fashion, a stream of the liquid is withdrawn from a lower plate or preferably from the bottom of the absorber, and returned to a higher plate, preferably the plate just below the point of withdrawal for the upper zone, as by means of a conduit 22, 23, 24 containing a pump 23a. The amount of liquid recirculated in the lower zone of the absorber is such as to assure that the pH everywhere in the lower zone exceeds 6.5.

As a result of this arrangement, the small overflow of the acid liquid from the upper zone into the lower zone, as at 26, mixes with the larger volume of the slurry in the lower zone containing dissolved ammonia, which immediately precipitates the iron in solution, presumably as ferrous hydroxide, to give a resulting slurry having a pH which does not fall below 6.5. On the plates in this lower zone the HCN and $H_2S$ are absorbed from the coke oven gas. These then react with the ferrous iron to form the more insoluble ferrous sulfate or ferro-cyanates in the liquid phase, and not predominantly at the gas-liquid interface. The avoidance of the interface reaction eliminates the tendency for the precipitate to build up in the bubble caps and thus plug the tower.

The quantity of liquid passing down the drain 26 is equal to the volume of liquid introduced through the inlet 12. It has been found that the recirculation rates over conduits 19 and 23 must be considerably greater than the rate at which liquid, i.e., slurry, is withdrawn through outlet 16 at the base of the tower, in order to maintain the aforementioned pHs in the upper and lower portions of the column. More specifically, the recirculation rate must be at least twice the liquid throughput of the tower and may be as high as ten times. By operating in this fashion, the liquid flowing down the drain 26 which has a pH of about 3.5, is quickly raised in the lower zone to pH 6.5 or above. While recirculation rates will vary according to the capacity and throughput of the column, and the design of the bubble caps and risers or other contact devices employed, once the column is in operation, the recirculation rates are easily adjusted to avoid the presence of any appreciable quantity of liquid in the sticky range.

Having thus described our novel method of reacting the waste ferrous sulfate-containing pickle liquor and raw coke oven gas, we will now further describe the present invention as it relates to the production of ammonium sulfate crystals from the absorber slurry which are substantially free of discoloring ferrous iron. Reference may be had to the schematic flow diagram of FIG. 2 for a further understanding of this aspect of the invention.

In one embodiment of the present invention, the absorber slurry is first processed to remove the iron and pyridine precipitates therefrom, which are either discarded or subsequently oxidized and otherwise treated for recovery of sulfur, iron and pyridine values. The separation is effected by any suitable liquid-solid separation method, as for example, by filtering or centrifuging or both. The resulting solid-free sulfate solution, however, still contains some residual iron, in fact, sufficient ferrous iron so that if the solution were evaporated and crystallized, the crystals would, upon exposure to air, become discolored by the presence of ferric iron. The residual iron in the separated ammonium sulfate solution will react with oxygen in solution or from the air to form ferric iron which precipitates as a colloidal hydroxide, leaving the solution an intense reddish-brown color, unless precautions are taken at this stage to prevent this, as discussed below.

Thus, in accordance with a controlling aspect of the present invention, instead of completely aerating the solution and allowing the ferric iron precipitate formed therein to settle at this stage, which has been the practice heretofore, we immediately adjust the pH of the separated ammonium sulfate solution to between about 2 and 4.5 and preferably between about 3 and 3.5 by the addition of sulfuric acid. This timely pH adjustment prevents oxidation of any ferrous iron in the solution and thus avoids the formation of a colloidal iron precipitate. It has the further advantage of promoting the growth of larger crystals of ammonium sulfate in the subsequent evaporation and crystallization steps. It is important to make the pH adjustment as promptly as possible following separation of the absorber solids from the ammonium sulfate solution before any dissolved oxygen reacts with the residual traces of ferrous iron present to produce the colloidal color. By proceeding in this manner, it is entirely unnecessary to aerate or oxidize the ammonium sulfate solution to reduce residual ferrous iron therein to an acceptable level.

As noted above, the absorber solids which are separated from the ammonium sulfate solution may, if desired, be oxidized and subsequently treated for the recovery of sulfur, iron and pyridine values. This oxidation may instead be carried out on the slurry removed from the absorber, that is, prior to separation of the ammonium sulfate solution from the solids. In the accompanying flow diagram, oxidizing equipment is shown between the absorber and the centrifuge; however, the lines leading to and from the oxidizer are valved to indicate that the preliminary oxidation is optional. Oxidation of the absorber slurry is described in the aforementioned copending Muns et al. application. In that process, it is necessary, as above explained, to allow the ammonium sulfate solution separated from the oxidized slurry by filtration or centrifugation, to stand for a considerable period of time in a vessel of large holding capacity to allow time for any residual iron present in the solution to oxidize and settle out. Following settling, the clarified ammonium sulfate liquor is decanted and sent to the evaporation and crystallization steps.

In accordance with another aspect of the present invention, when the slurry is oxidized prior to solids removal, instead of allowing the ammonium sulfate liquor separated from the oxidized absorber slurry to stand and subsequently be decanted, the solution is immediately acidified as above described and then passed to evaporators.

While oxidation of the absorber slurry prior to solids removal is not a required step in the process of the present invention, where it is carried out, certain conditions must be adhered to. For example, the slurry from the absorber is passed to one or a series of oxidizing vessels having motor-driven agitators to which air is introduced. During oxidation the iron sulfide present in the slurry is converted to iron oxide and free sulfur. The complex iron-ammonium ferrocyanides are oxidized to ferroso-ferric ammonium ferrocyanides accompanied by the release of small quantities of ammonia. The complex ferrocyanides of pyridine are also decomposed releasing pyridine as such.

The higher the pH the more rapidly oxidation occurs. However, should the pH exceed 7.8 the ferrocyanides present remain in solution with the ammonium sulfate and are entrained in the crystallized ammonium sulfate product giving it a blue color which impairs its salability. Accordingly, the pH during oxidation must be maintained below 7.8.

On the other hand, the lower the pH the slower the oxidation. For example, if the slurry fed to the oxidizer is at a pH well below 6.8, it will contain soluble iron as ferrous sulfate which reacts with water and oxygen to form ferric oxide and sulfuric acid. Under these conditions, the sulfuric acid formed lowers the pH in the oxidizer until the reaction is slowed down to a practically inoperable level. This may be overcome by introducing free ammonia, thus raising the pH and maintaining an acceptable oxidation rate. However, the addition of ammonia promotes formation of undesirable thiocyanates.

As the absorber slurry enters the oxidizer, it contains iron sulfide and complex iron cyanides in precipitated form. During oxidation, iron sulfide is preferentially oxidized to iron oxide. However, the complex iron cyanides remain insoluble only so long as the slurry contains a small but appreciable amount of unoxidized iron sulfide. Thus the iron sulfide should be held above a critical minimum level of about 0.2-0.5% by weight of the total slurry. If iron sulfide falls below this critical minimum, then the complex iron cyanides are oxidized to form soluble cyanide compounds which appear as contaminants in the final crystallized ammonium sulfate. With the above residual amounts of iron sulfide present, the solids can be more easily separated from the slurry than otherwise. Retention of the above minimum amount of iron sulfide precipitate at this stage necessarily also entails retention of some ferrous sulfate in solution, because the ferrous iron is an intermediate in the oxidation of ferrous sulfide to ferrous hydroxide. Hence to avoid the disadvantage of blue ammonium sulfate crystals caused by the soluble cyanides, we thus are faced with the retention of ferrous iron which tends to produce brown crystals, unless the precautions of the present invention are employed.

As above stated, since the slurry from the absorption column has been reacted to substantial completion forming insoluble iron sulfide and complex iron ferrocyanide, it contains only traces of partially soluble ferrous hydroxide or other soluble iron compounds, and there will not be a sufficient drop in pH during oxidation to require the addition of ammonia to maintain the pH level at that necessary for a rapid oxidation rate. The lower pH limit for rapid oxidation is, as above noted, around 6.8 while the upper limit, namely, that at which the ferrocyanides become soluble, is about 7.8. Accordingly, when oxidation is carried out between pH 6.8 and 7.8, the addition of ammonia is unnecessary.

Following acidification of the ammonium sulfate solution which has been separated from the absorber solids or the oxidized solids, as the case may be, it is evaporated and crystallized in a conventional manner. Preferably a two-stage salting evaporator is employed. In the first stage, approximately half the total water to be removed from the solution is evaporated and the vapor from this first stage is condensed in the heat exchanger of the second stage. In the second stage the remaining water is evaporated, leaving a magma of ammonium sulfate crystals and mother liquor such that upon settling, the crystals occupy about 50% of the total volume. The magma is then withdrawn to a centrifuge where the crystals are collected, wrung out and completely dried by passing warm air through the bed. Ammonium sulfate is soluble to the extent of about 88 grams per 100 grams of water at 60° C. and about 103 grams per 100 grams of water at 100° C. The temperature in each stage depends upon the pressure and concentration of the solution and is maintained several degrees higher than the normal boiling point of water at that pressure.

While ammonium sulfate does entrain many metals, for example, copper, nickel, cobalt, manganese, zinc and magnesium, all of these metals form soluble complexes with ammonia and all of them form double salts with ammonium sulfate which are insoluble in saturated ammonium sulfate solutions. Ferrous and ferric iron do not form complexes or double salts and accordingly iron will build up in the mother liquor to a rather high level. The ammonium sulfate crystals so produced can accurately and easily be separated from the mother liquor, but they remain moistened with it. When this moisture dries, some of the dissolved iron is of course left in the product. However, where the ferrous iron in the crystals does not exceed about 0.04%, there is no noticeable coloration of the crystals upon drying and exposure to air.

All or part of the mother liquor may be recycled to the absorber pickle liquor feed or to either the first or the second stage of the evaporator, and division of the mother liquor depends upon operating conditions. While heat economy favors recycling the mother liquor within the crystallizing evaporator, if all of the mother liquor is recycled, the ferrous iron content builds up without limit until crystals of ferrous sulfate are formed along with the crystals of ammonium sulfate. Well before this point is reached, the high ferrous sulfate content of the mother liquor would leave an appreciable amount of iron in the ammonium sulfate crystal product since not all of the mothoer liquor is thrown off the crystals in the centrifuge. Accordingly, the small percentage of moisture left in the crystals would give a corresponding iron content to the product which on subsequent exposure to air would result in oxidation to ferric iron and discoloration.

This objectionable discoloration is not formed if, as noted, the ferrous iron content of the crystals is below about 0.04%, or if the ferrous iron content of the mother liquor is not above about 1-2 grams per liter. When the process is operating normally approximately 90 to 95% of the mother liquor is recycled to the evaporators and only 5 to 10% returned to the absorber in order to limit ferrous iron in the mother liquor to below 1-2 grams per liter. If the process is not so controlled and as much as 1 gram per liter of ferrous iron is present in the ammonium sulfate fed to the evaporator, substantially all of the mother liquor must be recycled to the absorber. The amount of recycle is therefore dependent upon the amount of ferrous iron in the feed to the evaporators, and to a lesser extent upon the degree of color which can be tolerated in the ammonium sulfate crystal product.

As noted above, the division of the mother liquor between recycle to the absorber and recycle to the evaporators, is dependent upon operating conditions. However, the pickle liquor entering the absorber must be diluted to avoid forming too thick a slurry therein which would impair absorber efficiency. Dilution is effected preferably by including the wash liquor from the separated absorber solids, whether oxidized or not, and by recycling the mother liquor when necessary, and by adding water if required. While a portion of the ammonium sulfate mother liquor is recycled to the absorber, the present invention does not require the presence of any minimum concentration of ammonium sulfate in the absorber feed.

If absolute freedom from iron in the ammonium sulfate crystal product is necessary, which generally is not the case, this degree of purity may be attained by dissolving part of the product and using this iron-free solution to wash the crystals on the centrifuge before drying.

What is claimed is:

1. A process for treating waste ferrous sulfate-containing pickle liquor with raw coke oven gas which comprises reacting said gas with the pickle liquor to precipitate substantially all of the iron present as insoluble sulfides and ferrocyanides and pyridine present as insoluble pyridine ferrocyanides in an aqueous ammonium sulfate solution, separating the solids thus formed from the ammonium sulfate solution, immediately thereafter acidifying said ammonium sulfate solution to a pH between about 2 and 4.5, evaporating the solution and separating ammonium sulfate crystals therefrom.

2. A process for treating waste ferrous sulfate-containing pickle liquor with raw coke oven gas which comprises reacting said gas with the pickle liquor to precipitate substantially all of the iron present as insoluble sulfides and ferrocyanides and pyridine present as insoluble pyridine ferrocyanides in an aqueous ammonium sulfate solution, completing the reaction at a pH of about 7.5–7.8, separating the solids thus formed from the ammonium sulfate solution, immediately thereafter acidifying said ammonium sulfate solution to a pH between about 2 and 4.5, evaporating the solution and separating solid ammonium sulfate therefrom, and recycling a portion of the mother liquor to the evaporating step, said portion containing less than about 1–2 grams/liter of ferrous iron.

3. A process for treating waste ferrous sulfate-containing pickle liquor with raw coke oven gas which comprises reacting said gas with the pickle liquor containing sufficient available sulfate radical to react with substantially all of the ammonia in said gas, completing the reaction at a pH of about 7.5–7.8, separating the solids thus formed from the ammonium sulfate solution, immediately thereafter acidifying said ammonium sulfate solution to a pH between about 2 and 4.5, evaporating the acidified solution and separating ammonium sulfate crystals substantailly free of ferrous iron therefrom.

4. A process for treating waste ferrous sulfate-containing pickle liquor with raw coke oven gas which comprises reacting said gas with the pickle liquor containing sufficient available sulfate radical to react with substantially all of the ammonia in said gas, completing the reaction at a pH of about 7.5–7.8, separating the solids from the ammonium sulfate solution, immediately thereafter acidifying said ammonium sulfate solution to a pH between about 3 and 3.5, evaporating the acidified solution and separating ammonium sulfate crystals substantially free of ferrous iron therefrom.

5. A process for treating waste ferrous sulfate-containing pickle liquor with raw coke oven gas, which comprises reacting said gas with the liquor to precipitate substantially all of the iron present as sulfides and ferrocyanides and precipitate pyridine as a ferrocyanide in an aqueous ammonium sulfate solution, oxidizing the slurry thus produced, separating ammonium sulfate solution from the products of oxidation, immediately thereafter acidifying said separated ammonium sulfate solution to a pH between about 2 and 4.5, and then evaporating the solution and separating ammonium sulfate crystals therefrom.

6. A process as set forth in claim 5 wherein said pickle liquor and raw coke oven gas reaction is carried out in the presence of sufficient available sulfate radical to react with substantially all of the ammonia in said raw coke oven gas, and the reaction is completed at a pH of about 7.5–7.8.

7. A process for treating waste ferrous sulfate-containing pickle liquor with raw coke oven gas, which comprises reacting said gas with the liquor to precipitate substantially all of the iron present as sulfides and ferrocyanides and precipitate pyridine as a ferrocyanide in an aqueous ammonium sulfate solution, completing the reaction at a pH of about 7.5–7.8, oxidizing the slurry thus produced at a pH between about 6.8 and 7.8, separating ammonium sulfate solution from the products of oxidation, immediately thereafter acidifying said separated ammonium sulfate solution to a pH between about 2 and 4.5, and then evaporating the solution and separating ammonium sulfate crystals.

8. A process for treating ferrous sulfate-containing pickle liquor with raw coke oven gas in an absorber having two connecting liquid-gas contact zones, which comprises, introducing pickle liquor to the upper portion of the first said zone and introducing said gas to the lower portion of the second said zone, countercurrently flowing the liquor and gas through said zones, recirculating liquid in the first zone in amount sufficient to maintain the pH in said zone between about 0.5 and about 3.5, recirculating liquid in the second zone in amount sufficient to maintain the pH between about 6.5 and 7.8, exhausting purified coke oven gas from the upper portion of the first zone, withdrawing a slurry comprising liquid and solid reaction products from the lower portion of the second zone, separating the liquid and solid reaction products, immediately thereafter acidifying the liquid product to a pH between about 2 and 4.5 to prevent oxidation of ferrous iron present in separated liquid product, evaporating the thus acidified liquid product and separating ammonium sulfate crystals substantially free of ferrous iron therefrom.

9. A process as set forth in claim 8 wherein the rate of withdrawal of slurry from the lower zone is substantially equal to the rate of flow of liquid from the first to the second zone.

10. A process as set forth in claim 8 wherein the rates of recirculation in said zones are at least equal to twice the liquid throughput of the absorber.

11. A process as set forth in claim 8 wherein the pH of the slurry withdrawn from the second zone is between about 7.5 and 7.8.

References Cited in the file of this patent

UNITED STATES PATENTS

| | | |
|---|---|---|
| 1,957,267 | Hansen | May 1, 1934 |
| 2,511,307 | Tiddy | June 13, 1950 |
| 2,656,248 | Simms | Oct. 20, 1953 |
| 2,880,061 | Muns et al. | Mar. 31, 1959 |

FOREIGN PATENTS

| | | |
|---|---|---|
| 152,766 | Great Britain | Oct. 21, 1920 |
| 791,057 | Great Britain | Feb. 19, 1958 |